United States Patent Office.

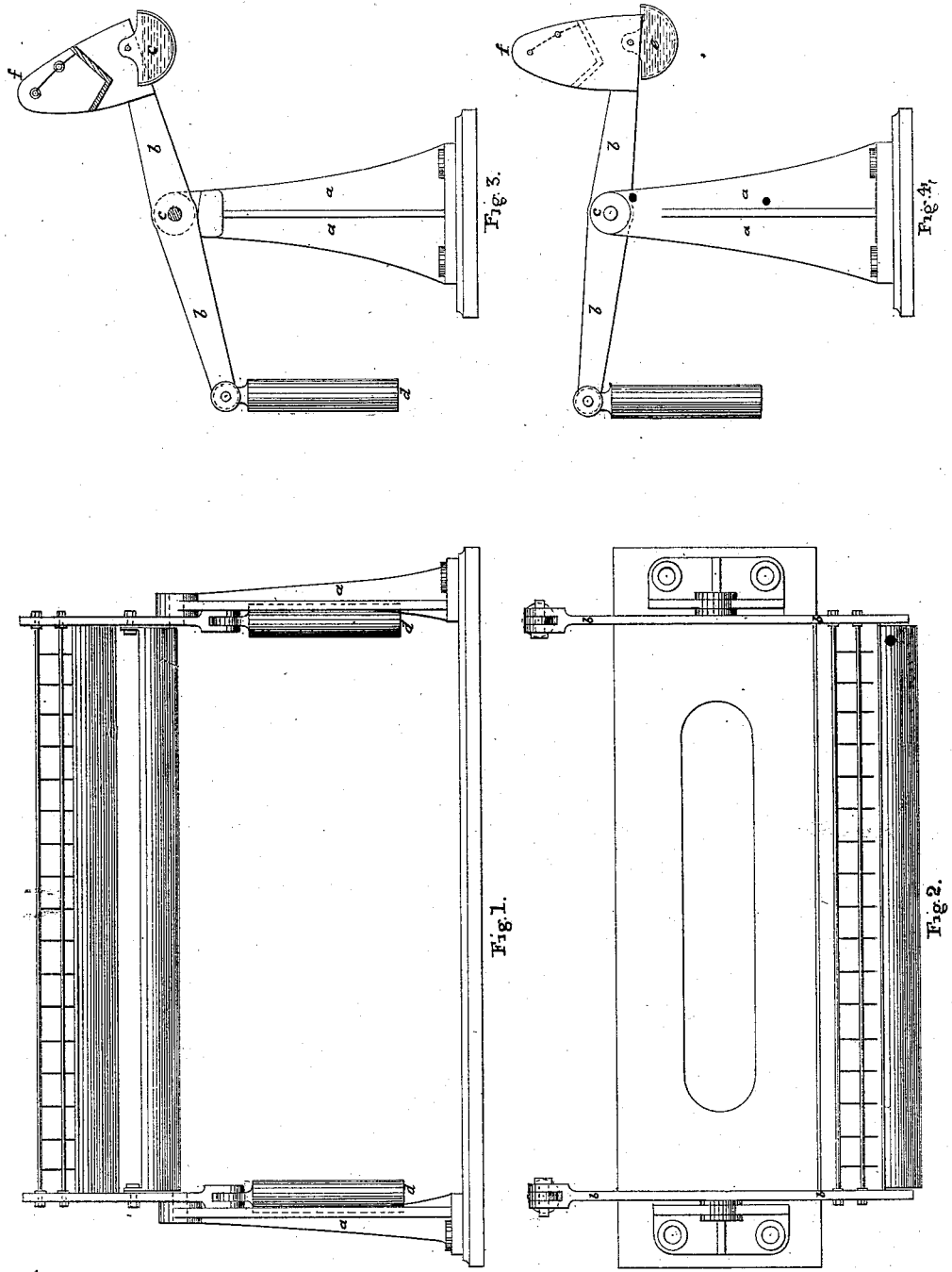

WILLIAM JAMES BONSER, OF LONDON, ENGLAND.

Letters Patent No. 104,105, dated June 14, 1870.

IMPROVEMENT IN APPARATUS FOR FEEDING CATTLE ON RAILWAY-TRUCKS.

The Schedule referred to in these Letters Patent and making part of the same

I, WILLIAM JAMES BONSER, of London, England, have invented certain Improvements in Apparatus to be used for Feeding and Watering Cattle in Railway-Trucks, of which the following is a specification.

Nature and Objects of the Invention.

My invention relates to improvements in apparatus for feeding and watering cattle upon railways more conveniently and economically, and without that amount of alteration of the trucks or construction of special trucks heretofore necessary.

Description of Drawing.

Figure 1 is a side elevation of an apparatus constructed according to my invention.

Figure 2 is a plan of the same.

Figures 3 and 4 are end views of the apparatus.

General Description.

In carrying out my invention I use vertical uprights $a$, carrying at their upper ends the levers $b$, which levers $b$ are hinged or jointed, as at $c$, so that they are free to move within the joint, these levers $b$ each carrying at one of their ends a balance-weight, $d$.

Two or more of the uprights $a$ are placed side by side along the railway line or siding, and in that position the ends of the levers $b$ opposite to those carrying the balance-weight $d$, are made to support or carry either a trough for holding the water for the cattle, or a rack for the hay or other food, or both may be carried, as shown in the drawing, the trough for water being marked $e$, and the food-rack $f$.

The levers $b$ are so weighted and adjusted by means of the balance weights $d$, that upon the trough $e$ and the rack $f$ (where both are used) being filled, they will overcome the resistance of the weights $d$, and be brought to a horizontal position, as shown in fig. 4, and will then be next the trucks, at a height suitable for cattle to feed or drink.

When the food is consumed, or the water drank or run off, the balance-weights will raise the trough and rack from the cattle-trucks and remove them to the position shown in fig. 3, where they will be quite clear of the trucks, and present no obstruction to the passage of trains.

Claim.

I claim as my invention—

The arrangement of levers $b$, hinged or jointed to vertical standards or uprights $a$, two or more of such levers $b$ supporting at one of their ends troughs and racks, or either, and at their other ends balance-weights $d$, so adjusted that when the troughs are empty, these weights will carry the troughs and racks in the direction of the arc of a circle away from and clear of the line of trucks, but, when the troughs and racks are filling or filled, will permit their descent until they assume a position alongside and close to the cattle-trucks.

WILLIAM JAMES BONSER.

Witnesses:
W. W. WYNN,
    24 Royal Exchange, London.
M. A. SOUL,
    14 Finsbury Place, London.